Patented Mar. 7, 1950

2,499,725

UNITED STATES PATENT OFFICE 2,499,725

PROCESS FOR MAKING ESTERS OF MONOCARBOXYLIC ACIDS

Harry B. Copelin, Niagara Falls, N. Y., assignor to E. I. du Pont de Nemours & Company, Wilmington, Del., a corporation of Delaware No Drawing. Application February 6, 1948, Serial No. 6,807

5 Claims. (Cl. 260—496)

This invention relates to esters of carboxylic acids, and more particularly to an improved method for preparing them.

Tetramethylene diacetate has been prepared in the past by heating tetrahydrofuran and acetic anhydride to high temperatures in the presence of a small amount of zinc chloride. Because of the high temperature, of at least 190° C., which is necessary to cause this reaction to take place, the process must be carried out under pressure. Since this particular reaction mixture is exceedingly corrosive under these conditions, the process has serious disadvantages, particularly from a commercial standpoint, since it requires the use of reaction vessels constructed of materials capable of withstanding severe corrosive conditions at high temperatures under pressure. Perchloric acid has also been proposed as a catalyst in the reaction of tetrahydrofuran with acetic anhydride, but on account of its explosive characteristics this acid is not desirable for use in large-scale operations because of the hazards involved.

This invention has as an object a new and improved process for obtaining monocarboxylic acid esters. A further object is an economical method for obtaining monocarboxylic acid esters of tetramethylene glycol and of bis(4-hydroxybutyl) ether. Other objects will appear hereinafter.

I have found that these esters can be obtained readily and in high yield by reacting tetrahydrofuran with an anhydride of an aliphatic monocarboxylic acid in the presence of boron trifluoride. This substance is particularly effective as a catalyst in initiating the reaction at low temperatures, and because of this the use of pressure equipment is unnecessary. Furthermore, the proportions of the different esters produced can be varied by changing the operating conditions. The process of this invention is particularly effective with anhydrides of lower saturated aliphatic acids, i. e., with anhydrides of aliphatic carboxylic acids having from 2 to 4 carbon atoms, inclusive.

The process of this invention is carried out by contacting a mixture of tetrahydrofuran and an anhydride of a lower fatty acid, e. g., acetic anhydride, with a small amount of boron trifluoride. The length of time required for the reaction to take place varies with the reaction temperature employed. At temperatures of 20–30° C. reaction periods of 15 to 96 hours are required, while at higher temperatures, e. g., at the temperature of the refluxing reaction mixture, which occurs at an initial temperature of about 70–80° C., only 4 to 10 hours are required. At the lower reaction temperatures the reaction product contains substantial amounts of both tetramethylene diacetate and bis(4-acetoxybutyl) ether. At the higher temperatures the reaction product is substantially all tetramethylene diacetate. The reaction products are separated from the catalyst and from unreacted ingredients by conventional methods, such as by fractional distillation of the reaction mixture. If products of higher purity are desired, they can be redistilled through an efficient fractionating column.

An embodiment of this invention which produces maximum yields of the tetramethylene ester involves heating a mixture of tetrahydrofuran and a 10 to 20 mole per cent excess of an anhydride of a lower fatty acid under reflux in the presence of from 0.4% to 1.5%, based on the weight of tetrahydrofuran, of boron trifluoride as catalyst. The solution temperature at which refluxing begins depends mainly on the amount of tetrahydrofuran present. Thus, under usual conditions refluxing begins at about 70–80° C. and at this temperature the reaction takes place readily. The temperature at which reflux occurs will increase gradually as the tetrahydrofuran is consumed by the reaction, so that the temperature may be carried up to about 160° C. without need of pressure equipment.

The invention is illustrated in greater detail by the following examples, in which the proportions of the ingredients are expressed in parts by weight unless otherwise specified.

Example I

A mixture of 14.4 parts of tetrahydrofuran, 30 parts of acetic anhydride, and 1 part of a 20% solution of boron trifluoride in diethyl ether is placed in a reaction vessel fitted with a reflux condenser and heated until the mixture boils, which is at a temperature of about 70° C. The reaction mixture is refluxed for 6 hours, during which time its temperature gradually increases as the tetrahydrofuran is consumed. The unreacted ingredients are separated from the reaction mixture by distillation under reduced pressure after which the residue, containing crude tetramethylene diacetate, is distilled through an efficient fractionating column. There is obtained a yield of 25 parts, corresponding to 72% of the theoretical, of 1,4-tetramethylene diacetate boiling at 100–110° C. at 8–10 mm., and having a refractive index, $n_D^{25}$, of 1.4222.

Example II

A reaction vessel is charged with 1,020 parts of acetic anhydride and 576 parts of dry tetrahydrofuran. After thoroughly mixing these reactants at room temperature, 10 parts of boron fluoride/ethyl ether complex is added. After 20 hours at 20–25° C. an additional 10 parts of boron fluoride/ethyl ether complex is added and the mixture allowed to stand another 20 hours. At the end of this time the unused tetrahydrofuran is distilled off under atmospheric pressure and the distillation is then continued under reduced pressure. After removal of acetic acid and unused acetic anhydride, there is obtained 460 parts (33% of the theoretical) of tetramethylene diacetate boiling at 100–110° C. at 10 mm. There is also obtained 585 parts (57.7% of the theoretical) of bis(4-acetoxybutyl) ether boiling at 145–155° C. at 5 mm. This acetoxybutyl ether is a colorless liquid, slightly soluble in water and soluble in common organic solvents. It has a boiling point of 143° C. at 5 mm., a density, $D_4^{25}$, of 1.026 and a refractive index, $n_D^{25}$, of 1.4345. Alcoholysis of the bis(4-acetoxybutyl) ether yields bis(4-hydroxybutyl) ether boiling at 155° C. at 5 mm., $n_D^{25}=1.4560$, and $D_4^{25}=1.001$.

Analysis: calc'd: hydroxyl, 19.1%. Found: hydroxyl, 17.7%.

The examples have illustrated the process of this invention with particular reference to the use of acetic anhydride. However, other anhydrides of lower, saturated aliphatic monocarboxylic acids, especially those acids having from 2 to 4 carbon atoms, inclusive, can be used. Additional examples of such anhydrides which are operable include propionic and n-butyric anhydrides.

While it is preferred to use an excess of the carboxylic acid anhydride, e. g., 10 to 50 mole per cent excess, in the process of this invention, the reaction takes place when proportions of ingredients outside this arnge are used. An excess of tetrahydrofuran can be used if desired, but the yields of the desired products are lower. For example, in a process similar to that of Example II, but in which a 25 mole per cent excess of tetrahydrofuran is used and 2% of boron trifluoride etherate is used as catalyst only 59.8% of the tetrahydrofuran is converted to tetramethylene diacetate and bis(4-acetoxybutyl) ether in 96 hours at 20–25° C., whereas, 90.7% of the tetrahydrofuran is converted to these products in Example II.

Likewise, in addition to the boron trifluoride etherate used in the examples, there can be used as catalyst boron trifluoride alone or its coordination complexes with other organic compounds such as its complexes with other ethers such as methyl and butyl, or with methanol. The proportions of catalyst employed can vary widely, amounts ranging from as little as 0.2% by weight of the tetrahydrofuran up to as much as 10% of the tetrahydrofuran being generally operable. Proportions of about 0.4% to 1.5% are preferred in reactions carried out at 70° C. or higher, while proportions of 1% to 5% are preferred at lower temperatures, e. g., at 20°–25° C. Boron trifluoride and its coordination complexes are unexpectedly effective in initiating and catalyzing the ring fission of tetrahydrofuran at moderately elevated temperatures and at atmospheric pressure. No ring fission of tetrahydrofuran occurs when it is heated with acetic anhydride under conditions similar to those used in Example I in the presence of compounds such as zinc chloride, sulfuric acid, sodium bisulfate, benzoyl peroxide, and alpha, alpha'-azodiisobutyronitrile.

The process of this invention is particularly useful for producing esters of tetramethylene glycol and of bis(4-hydroxybutyl) ether on a large scale. The products are particularly useful as high boiling solvents and as intermediates for other chemical compounds, e. g., as intermediates for the preparation of the corresponding glycols.

As many apparently widely different embodiments of this invention may be made without departing from the spirit and scope thereof, it is to be understood that I do not limit myself to the specific embodiments thereof except as defined in the appended claims.

I claim:

1. A process for obtaining monocarboxylic acid esters, said process comprising reacting at a temperature of from 20° to 160° C. tetrahydrofuran with an anhydride of an aliphatic monocarboxylic acid in contact with boron trifluoride catalyst.

2. A process for obtaining tetramethylene diacetate which comprises reacting in contact with boron trifluoride catalyst tetrahydrofuran with from 10 to 50 mole percent excess thereof of acetic anhydride at a temperature of from 20 to 160° C., and then isolating the tetramethylene diacetate from the reaction mixture.

3. A process for obtaining tetramethylene diacetate which comprises reacting in contact with boron trifluoride catalyst tetrahydrofuran with acetic anhydride at a temperature of from 20 to 160° C., and then isolating the tetramethylene diacetate from the reaction mixture.

4. The process set forth in claim 1 in which said anhydride is an anhydride of an aliphatic monocarboxylic acid having from 2 to 4 carbon atoms.

5. A process for obtaining tetramethylene diacetate which comprises reacting in contact with boron trifluoride catalyst tetrahydrofuran with from 10 to 50 mole percent excess thereof of acetic anhydride at a temperature of from 20 to 160° C.

HARRY B. COPELIN.

REFERENCES CITED

The following references are of record in the file of this patent:
(1939).

Certificate of Correction

March 7, 1950

Patent No. 2,499,725

HARRY B. COPELIN

It is hereby certified that errors appear in the printed specification of the above numbered patent requiring correction as follows:

Column 2, line 14, for "20 mole" read *50 mole*; column 3, line 38, for "arnge" read *range*; column 4, line 61, under the heading "REFERENCES CITED" before "(1939)." insert *Paul, Comptes Rendues, vol. 208, pp. 587–589*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*